United States Patent
Simon

(10) Patent No.: US 11,361,450 B2
(45) Date of Patent: Jun. 14, 2022

(54) METHOD FOR DETERMINING MUTUALLY CORRESPONDING PIXELS, SOC FOR CARRYING OUT THE METHOD, CAMERA SYSTEM INCLUDING THE SOC, CONTROL UNIT AND VEHICLE

(71) Applicant: Robert Bosch GmbH, Stuttgart (DE)

(72) Inventor: Stephan Simon, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/051,555

(22) PCT Filed: May 9, 2019

(86) PCT No.: PCT/EP2019/061926
§ 371 (c)(1),
(2) Date: Oct. 29, 2020

(87) PCT Pub. No.: WO2019/242929
PCT Pub. Date: Dec. 26, 2019

(65) Prior Publication Data
US 2021/0233257 A1    Jul. 29, 2021

(30) Foreign Application Priority Data

Jun. 19, 2018    (DE) .......................... 102018209898.0

(51) Int. Cl.
*G06T 7/246* (2017.01)
*B60R 11/04* (2006.01)
*H04N 7/18* (2006.01)

(52) U.S. Cl.
CPC .............. *G06T 7/248* (2017.01); *B60R 11/04* (2013.01); *H04N 7/183* (2013.01); *G06T 2207/10016* (2013.01); *G06T 2207/30252* (2013.01)

(58) Field of Classification Search
CPC ........... G06T 7/248; G06T 2207/10016; G06T 2207/30252; B60R 11/04; H04N 7/183
(Continued)

(56) References Cited

U.S. PATENT DOCUMENTS

2018/0365524 A1* 12/2018 Kajiwara ................ G06T 7/246
2019/0355148 A1* 11/2019 Horita ..................... G06T 7/593

FOREIGN PATENT DOCUMENTS

DE           10351778 A1    6/2005

OTHER PUBLICATIONS

International Search Report for PCT/EP2019/061926, dated Jul. 3, 2019.
(Continued)

*Primary Examiner* — Allen C Wong
(74) *Attorney, Agent, or Firm* — Norton Rose Fulbright US LLP; Gerard Messina

(57) ABSTRACT

A method for continuously determining mutually corresponding pixels between a first camera image and a second camera image. The method includes recording the first camera image; recording the second camera image; ascertaining at least one first signature matrix element of a first signature matrix as a function of the first camera image; assigning first coordinates to an ascertained signature value of the first signature matrix element in a signature value position table; ascertaining at least one signature value of a second signature matrix element having second coordinates of a second signature matrix as a function of the second camera image; and determining at least one element of a correspondence matrix as a function of the signature value position table, of the cyclically ascertained signature value of the second signature matrix element and of the second coordinates of this second signature matrix element.

14 Claims, 8 Drawing Sheets

(58) Field of Classification Search
USPC .......................................................... 348/113
See application file for complete search history.

(56) References Cited

OTHER PUBLICATIONS

Stein F., "Efficient Computation of Optical Flow Using the Census Transform," Electronic Publishing, Artistic Imaging, and Digital Typography, [Lecture Notes in Computer Science, ISSN 0302-9743], Springer Verlag, vol. 3175, 2004, pp. 79-86.
Yu Tanabe et al., "Fast and Accurate Optical Flow Estimation Using FPGA," ACM Sigarch Computer Architecture News, ACM Special Interest Group on Computer Architecture, vol. 42, No. 4, 2014, pp. 27-32.
Cornelia Beck et al., "Integration of Multiple Temporal and Spatial Scales for Robust Optic Flow Estimation in a Biologically Inspired Algorithm," Computer Analysis of Images and Patterns, [Lecture Notes in Computer Science], Springer, Berlin, Heidelberg, 2007, pp. 53-60.
Claus C et al., "High Performance FPGA Based Optical Flow Calculation Using the Census Transformation," Intelligent Vehicles Symposium, IEEE, 2009, pp. 1185-1190.
Camellini Gabriele et al., "3DV-AN Embedded, Dense Stereovision-Based Depth Mapping System," 2014 IEEE Intelligent Vehicles Symposium Proceedings, IEEE, 2014, pp. 1435-1440.
Dehnavi M et al., "FPGA Based Real-Time On-Road Stereo Vision System," Journal of Systems Architecture, vol. 81, 2017, pp. 32-43.

* cited by examiner

METHOD FOR DETERMINING MUTUALLY CORRESPONDING PIXELS, SOC FOR CARRYING OUT THE METHOD, CAMERA SYSTEM INCLUDING THE SOC, CONTROL UNIT AND VEHICLE

FIELD

The present invention relates to a method for continuously determining mutually corresponding pixels between a first camera image and a second camera image. The present invention further relates to a system-on-a-chip (SoC) for carrying out the method and to a camera system including the SoC. The present invention also relates to a control unit for carrying out the method. In addition, the present invention relates to a vehicle including this camera system or this control unit.

BACKGROUND INFORMATION

For the semi-autonomous or autonomous guidance of a vehicle, critical driving situations of the vehicle, for example, a risk of collision, should be detected at least in a time span of less than approximately 0.2 seconds. This time span corresponds to the average reaction time of a human. A faster reaction time compared to the human reaction, for example, a reaction time of 0.1 seconds, is more advantageous. In other words, a detection of a movement and a movement direction of a pixel or of an object requires a detection time span for autonomous or semi-autonomous driving of less than or equal to 0.2 seconds.

An ascertainment of a movement or of a movement direction of a pixel in a sequence of recorded camera images may, for example, be carried out as a function of a determination of the optical flow and/or of an identification of objects or of an object tracking. The identification of objects in only one image may be carried out with fewer computing operations and, therefore, faster than the calculation of the optical flow vectors between two images. Nevertheless, the ascertainment of the movement of a pixel and its movement direction as a function of the object identification is, in principle, always slower than a determination of optical flow vectors, since objects in a recorded camera image are initially identified without their movement parameters and the movement or a change of the movement direction of the identified objects only subsequently have to be ascertained as a function of a sequence of multiple camera images. The object identification is also carried out with the aid of neural networks trained using training data, which identify the objects based on experience. Potentially, therefore, not all objects are reliably identified in all situations. In contrast, the determination of the optical flow may be carried out regardless of training data and is basically analytical. However, the challenge in determining the optical flow is the rapid and reliable ascertainment of mutually corresponding pixels from different camera images, the camera images having a high resolution and being recorded preferably at a rapid recording rate.

German Patent Application No. DE 103 51 778 A1 describes a method for processing image data of moving scenarios. For this purpose, mutually corresponding pixels or image areas are identified in individual temporally consecutive image datasets. In a first step, the image datasets to be compared are transformed using a signature operator or a signature string, or a signature value is calculated for each pixel. This signature string is stored in a signature table assigned to one of the individual image datasets, together with the pixel coordinates.

A correspondence hypothesis is subsequently generated for the signature strings that are to be found in both tables.

An object of the present invention is to optimize an ascertainment of mutually corresponding pixels between a first camera image and a second camera image.

SUMMARY

The aforementioned objects may be achieved according to example embodiments of the present invention.

The present invention relates to a method for determining mutually corresponding pixels between a first camera image and a second camera image. In accordance with an example embodiment of the present invention, tor the corresponding pixels of the camera images, one optical flow vector of the pixel each from the first camera image to the assigned pixel in the second camera image, i.e., a movement direction and a movement velocity, in particular, is ascertained. Alternatively, it is possible with the method using trigonometric calculations to determine a distance between, for example, a vehicle and objects in the surroundings of the vehicle as a function of the corresponding pixels.

The recording of the first camera image takes place initially in the method according to the present invention, the first camera image being preferably continuously updated at a predefined recording rate or frame rate. The recording rate is advantageously greater than or equal to 5 camera images per second and particularly preferably greater than or equal to 60 camera images per second. A recording of the second camera image also takes place, the second camera image also preferably being continuously updated at the predefined recording rate of the first camera image. The second camera image is advantageously recorded with the aid of the camera temporally offset to the first camera image, this camera capturing both the first camera image as well as the second camera image and the time offset between the first camera image and the second camera image being positive or negative. In other words, the camera records preferably a sequence of camera images at the predefined recording rate. The recorded sequence of camera images is optionally buffered in an electronic memory, for example, in such a way that the previously recorded last 16 camera images are stored in the electronic memory in addition to the first and/or second camera image about to be recorded or most recently recorded. The method may, in principle, be applied to an arbitrary pair of camera images as first and second camera image from this sequence of camera images stored in the electronic memory. The first and second camera image particularly preferably includes at least the most recent or the instantaneously recorded camera image. In other words, the second camera image may be recorded chronologically after the first camera image or chronologically before the first camera image. Following the recording of the first camera image and the second camera image, it is optionally provided to adapt the first and second camera image. The first camera image and the second camera image are preferably transformed into gray-value images by the optional adaptation, this transformation of a camera image into a gray-value image being able to take place linearly or non-linearly. Alternatively or in addition, the optional adaptation may be carried out by a scaling of a size or of a resolution of the first camera image and of a size of the second camera image. The adaptation advantageously takes place at a predefined clock frequency, i.e., in a predefined sequence in each clock cycle of the clock frequency sequentially or pixel-by-pixel. Subsequently, an ascertainment of at least one first signature matrix element having first coordinates of a first signature matrix takes place per clock cycle and at the predefined clock frequency as a function of the first camera image. The clock frequency is predefined, in particular, by an SoC (system-on-a-chip) or by a control unit. In other words, one signature value each of the first signature matrix element of the first signature matrix is ascertained per clock cycle. The predefined clock frequency or computing clock frequency is preferably at least six orders of magnitude faster than the recording rate of the first and second camera image. Each ascertained signature value of a first signature matrix element of the first signature matrix represents in each case the surroundings of a pixel of the first camera image. In other words, first coordinates of an ascertained first signature matrix element in the first signature matrix have a fixed assignment to coordinates of a pixel of the first camera image. The signature values of the first signature matrix elements characterize the respectively assigned pixels via a computational surroundings description of the assigned pixel. The signature values are preferably each ascertained by one or by multiple simple computational operations from the adjacent pixel contents of the assigned pixel, for example, by multiple difference formation and/or summation of multiple gray values of immediately adjacent or nearby pixels. In one further method step, the first coordinate is subsequently assigned to the ascertained signature value in a signature value position table. In other words, a signature value ascertained in the instantaneous clock cycle is assigned the position in the signature value position table represented by the first coordinates of the first signature matrix element in the first signature matrix ascertained in the instantaneous clock cycle. Thus, in the ascertained or adapted signature value position table, a signature value is assigned first coordinates of the most recently ascertained first signature matrix element of the first signature matrix having this signature value. The method further includes an ascertainment of a concatenation matrix element of a concatenation matrix as a function of the first signature matrix and of the signature value position table. The ascertainment of the concatenation matrix element of the concatenation matrix takes place preferably in one clock cycle after each ascertainment of one first signature matrix element of the first signature matrix or before an overwriting of first coordinates assigned in the signature value position table to a signature value of the signature value position table. The ascertainment of the concatenation matrix takes place, in particular, by storing the most recent first coordinates of the signature value assigned to a signature value ascertained in the instantaneous clock cycle in the signature value position table in a concatenation matrix element having the first coordinates of the instantaneous clock cycle. Accordingly, a concatenation matrix element is determined before the ascertainment or before an adaptation of the signature value position table, i.e., before an assignment of the first coordinates to the signature value of the first signature matrix element in the signature value position table. Thus, the most recent first coordinates of a signature value determined in the instantaneous and in an earlier clock cycle are advantageously stored in the concatenation matrix. In one further method step, at least one signature value of one second signature matrix element of a second signature matrix is ascertained per clock cycle as a function of the second camera image, this ascertained signature value in each case representing the surroundings of a pixel of the second camera image. The signature values of the second signature matrix are also continuously or sequentially ascertained at the predefined clock frequency and in the predefined sequence, in each case one signature value per clock cycle. In a subsequent method step, at least one correspondence matrix is determined as a function of the determined signature value position table, of the ascertained signature value of the second signature matrix, of the ascertained concatenation matrix, of the first camera image, and of the second camera image via difference formation between first coordinates and second coordinates in each case having the same signature value.

In other words, to determine the correspondence matrix, for example, a difference is formed between the second coordinates of the second signature matrix element determined in the instantaneous clock cycle and the first coordinates in the signature value position table assigned to the signature value ascertained to this second signature matrix element or the older first coordinates assigned to these first coordinates in the concatenation matrix. In other words, the difference formation in the instantaneous clock cycle takes place between the second coordinates of the instantaneous clock cycle and as a function of a selection of the first coordinates from the concatenation matrix selected and assigned to the signature value of the second signature matrix of the instantaneous clock cycle and of the first coordinate from the signature value position table selected and assigned to this signature value, the selection taking place as a function of a property of the pixels assigned in each case to the first and second coordinates. This property of the pixels encompasses a color, a description of the surroundings of the respective pixel and/or a history of the respective pixel at the respective coordinates. The correspondence matrix advantageously represents mutually corresponding pixels and the respective ascertained optical flow vectors between the first camera image and the second camera image. The correspondence matrix is determined or adapted, in particular, also at the predefined clock frequency and continuously, in each case one correspondence matrix element per clock cycle. At least one correspondence matrix each is preferably ascertained for each spatial direction or image dimension. The correspondence matrix may optionally be further used in further method steps of a driver assistance method and/or be displayed to a user, for example, in a color-coded manner. As a driver assistance method step, for example, a brake of the vehicle is subsequently optionally activated as a function of the correspondence matrix. The method yields the advantage that a quick calculation of the correspondence matrix takes place with minimal memory requirement, even with high resolutions of the first and second camera images, the assignment of mutually corresponding pixels being reliable for a large number of the pixels of a camera image. Accordingly, mutually corresponding pixels from two camera images and the associated optical flow vectors are ascertained quickly and at high quality using this method. These advantages result, since the mutually corresponding pixels between a first camera image and a second camera image is determined as a function of the signature values, i.e., as a function of the surroundings of a respective pixel, and as a function of a property of the respective pixel.

In one preferred refinement of the present invention, the ascertained signature values of the first and second signature matrix have a predefined length greater than or equal to 8 bits and smaller than or equal to 32 bits, the length is particularly preferably 14 bits to 18 bits. With this refinement, the number of computational operations or the computing time for ascertaining the signature values of the first signature matrix elements and of the second signature matrix elements as well as the ascertainment of the correspondence matrix is reduced.

In one embodiment of the present invention, it may be provided to record multiple first camera images with respectively different time offsets relative to the second camera image. The method subsequently takes place cyclically for each of these recorded first camera images in parallel in such a way that multiple elements of respectively offset-dependent correspondence matrices are determined per clock cycle. This embodiment yields the advantage that the different correspondence matrices represent different velocity hypotheses of the mutually corresponding pixels. Subsequent method steps, for example, in a driver assistance method, may be advantageously carried out as a function of these offset-dependent correspondence matrices, as a result of which critical driving situations may be reliably identified.

In one further embodiment of the present invention, it may be provided to record multiple second camera images with respectively different time offsets relative to the first camera image. The method subsequently takes place cyclically for each of these recorded second camera images in parallel in such a way that multiple elements of respectively offset-dependent correspondence matrices are determined per clock cycle. This further embodiment yields the same advantages as the aforementioned embodiment, in addition to the advantage that the signature value position table and the concatenation matrix are ascertained only for the first camera image. Accordingly, resources are saved in this further embodiment, because the signature value position table and the concatenation matrix may be utilized collectively for determining the offset-dependent correspondence matrices.

A consolidated correspondence matrix may subsequently optionally be ascertained as a function of a comparison of the ascertained offset-dependent correspondence matrices among one another or in connection with earlier determined correspondence matrices. This yields the advantage that velocity hypotheses or the offset-dependent correspondence matrices are checked for plausibility and different velocity hypotheses of the pixels between the first and second camera image are taken into consideration. Different velocities of various pixels between the first and second camera image result, for example, already from the fact that the distances of objects in the surroundings of a vehicle are different and therefore a relative velocity between objects and the vehicle or of the pixels relative to one another varies. The reliability of the ascertained correspondence matrix elements in the consolidated correspondence matrix therefore increases compared to the individually ascertained offset-dependent correspondence matrices.

In one further refinement of the present invention, it may be provided to carry out an ascertainment of a first additional feature matrix as a function of the first camera image, an additional feature element of the first additional feature matrix representing a property of a pixel of the first camera image. The additional feature element represents, for example, a color value of an assigned pixel or of the surroundings of the pixel and/or a variance of color values in the surroundings of the pixel and/or a noise value in the surroundings of the assigned pixel and/or an identified object or segment assigned to the pixel in the first camera image and/or a property of the assigned pixel in the past. The additional feature elements of the additional feature matrix are ascertained, in particular, continuously at the predefined clock frequency. A second additional feature matrix is optionally ascertained in this refinement as a function of the second camera image, an additional feature element of the second additional feature matrix representing a property of an assigned pixel of the second camera image. For example, the additional feature element of the second additional feature matrix accordingly also represents a color value of an assigned pixel or of the surroundings of the pixel and/or a variance of color values in the surroundings of the pixel and/or a noise value in the surroundings of the assigned pixel and/or an identified object or segment in the second camera image assigned to the pixel and/or a property of the assigned pixel in the past. The additional feature elements of the second additional feature matrix are also ascertained advantageously continuously at the predefined clock frequency, in each case one additional feature element per clock cycle. In this refinement, the correspondence matrix is additionally ascertained as a function of the first additional feature matrix and of the second additional feature matrix. This results in the advantage of a more reliable assignment between two corresponding pixels between the first and the second camera image.

In one preferred embodiment of the present invention, it is possible to determine multiple signature value position tables and/or multiple concatenation matrices for the first signature matrix of a recorded first camera image, each signature value position table and/or each concatenation matrix representing in each case a subdivision of the first signature matrix. In other words, the examined image area for mutually corresponding pixels between the first camera image and the second camera image is limited by this embodiment to the respective subdivision of the first camera image or of the assigned first signature matrix.

As a result, the correspondence table is advantageously ascertained as a function of the second coordinates for the signature value of the second signature matrix ascertained in the instantaneous clock cycle and as a function of the signature value position table assigned to first coordinates corresponding to these second coordinates or as a function of the concatenation matrix assigned to first coordinates corresponding to these second coordinates. In this way, mutually corresponding pixels may be determined more quickly and efficiently. With this embodiment, it is possible to increase the recording rate for recording the first and second camera image, since the corresponding pixels are more rapidly and efficiently ascertained.

In one particularly preferred embodiment of the present invention, the correspondence matrix is determined as a function of a predefined search area. The predefined search area is ascertained preferably as a function of the second coordinates of the instantaneous clock cycle and/or as a function of temporally earlier determined correspondence matrices. For example, with a temporally earlier determined correspondence matrix or an earlier ascertained optical flow vector to a pixel, it is possible to estimate a movement of this pixel in the future or to determine the search area. The search area may further include multiple signature value position tables and/or concatenation matrices. In other words, one or multiple assigned first coordinates for an instantaneous ascertained signature value of a signature matrix element of the second signature matrix are advantageously identified in this embodiment for ascertaining the correspondence matrix, the correspondence matrix subsequently being ascertained as a function of first coordinates assigned in the signal value position table or tables, which are situated in the search area. In the case of multiple suitable first coordinates in the search area, the correspondence matrix is additionally ascertained as a function of a property of the respective pixel in the first camera image and second camera image and/or as a function of a first and/or second additional feature of the respective pixel. This embodiment increases the reliability of the ascertained mutually corresponding pixels. In addition, the method is accelerated with this embodiment.

In one embodiment of the present invention, it may be provided that one instantaneous first coordinate position for ascertaining a signature matrix element of the second signature matrix differs from an instantaneous second coordinate position for ascertaining a signature matrix element of the first signature matrix. The second coordinate position for ascertaining the signature matrix element of the second signature matrix is preferably a coordinate position processed before at least ten clock cycles for ascertaining the signature matrix element of the first signature matrix. In other words, the coordinate position of the signature matrix element of the first signature matrix processed in one instantaneous clock cycle and the coordinate position of the signature matrix element of the second signature matrix processed in the instantaneous clock cycle are offset relative to one another. This embodiment increases the reliability of the ascertained mutually corresponding pixels.

In one refinement of the present invention, an adaptation of a correspondence matrix element of the correspondence matrix is carried out as a function of the correspondence matrix elements in the surroundings of this correspondence matrix element and/or as a function of temporally earlier determined correspondence matrices. This results in the advantage of a subsequent filtering or plausibility check of the ascertained correspondence matrix or of the optical flow vectors or of the mutually assigned pixels. This refinement may be advantageous, in particular, in recorded high-resolution camera images in order to subsequently correct erroneous assignments between pixels of the first and second camera image, in particular, in an area of the camera images having increased structural repetitions, for example, of a depicted fence or of a depicted sky.

The present invention further relates to an SoC for carrying out the method according to the present invention, i.e., a system-on-a-chip (SoC). In accordance with an example embodiment of the present invention, the SoC is configured to record a first camera image with the aid of a camera, the first camera image being updated, in particular, continuously at a predefined recording rate or frame-rate. The SoC is further configured to record a second camera image, in particular, with the aid of the camera, the second camera image being updated advantageously continuously at the predefined recording rate or frame rate. The SoC has preferably at least one predefined clock frequency, one clock frequency being at least six orders of magnitude faster than the recording rate of the first and second camera image. The SoC is further configured to determine at least one correspondence matrix as a function of the recorded first camera image and of the recorded second camera image and to generate an output signal as a function of the determined correspondence matrix. The output signal represents, in particular, optical flow vectors between the first and the second camera image assigned to the coordinates of the pixels of the second camera image. The SoC according to the present invention has the advantage of effectively ascertaining with high quality mutually corresponding pixels between the first camera image and the second camera image with high resolutions of the camera images and fast recording rates of the camera images. A particularly minimal electrical memory requirement for the SoC results if elements of the first signature matrix and/or of the second signature matrix and/or of the concatenation matrix ascertained in the method are only briefly calculated or stored, and the corresponding memory locations are unblocked for newly calculated values, once is it certain that the respective memory location is no longer accessed.

The present invention also relates to a camera system, which includes at least one camera. In accordance with an example embodiment of the present invention, the camera system is configured to record a first camera image and a second camera image, in particular, temporally offset with respect to the first camera image, continuously at a predefined recording rate. In addition, the camera system also includes the SoC according to the present invention.

The present invention further relates to a control unit for carrying out the method according to the present invention.

The present invention also relates to a vehicle including the camera system according to the present invention or the control unit according to the present invention.

BRIEF DESCRIPTION OF THE DRAWINGS

Further advantages result from the following description of exemplary embodiments with reference to the figures.

DETAILED DESCRIPTION OF EXAMPLE EMBODIMENTS

Figure 1:
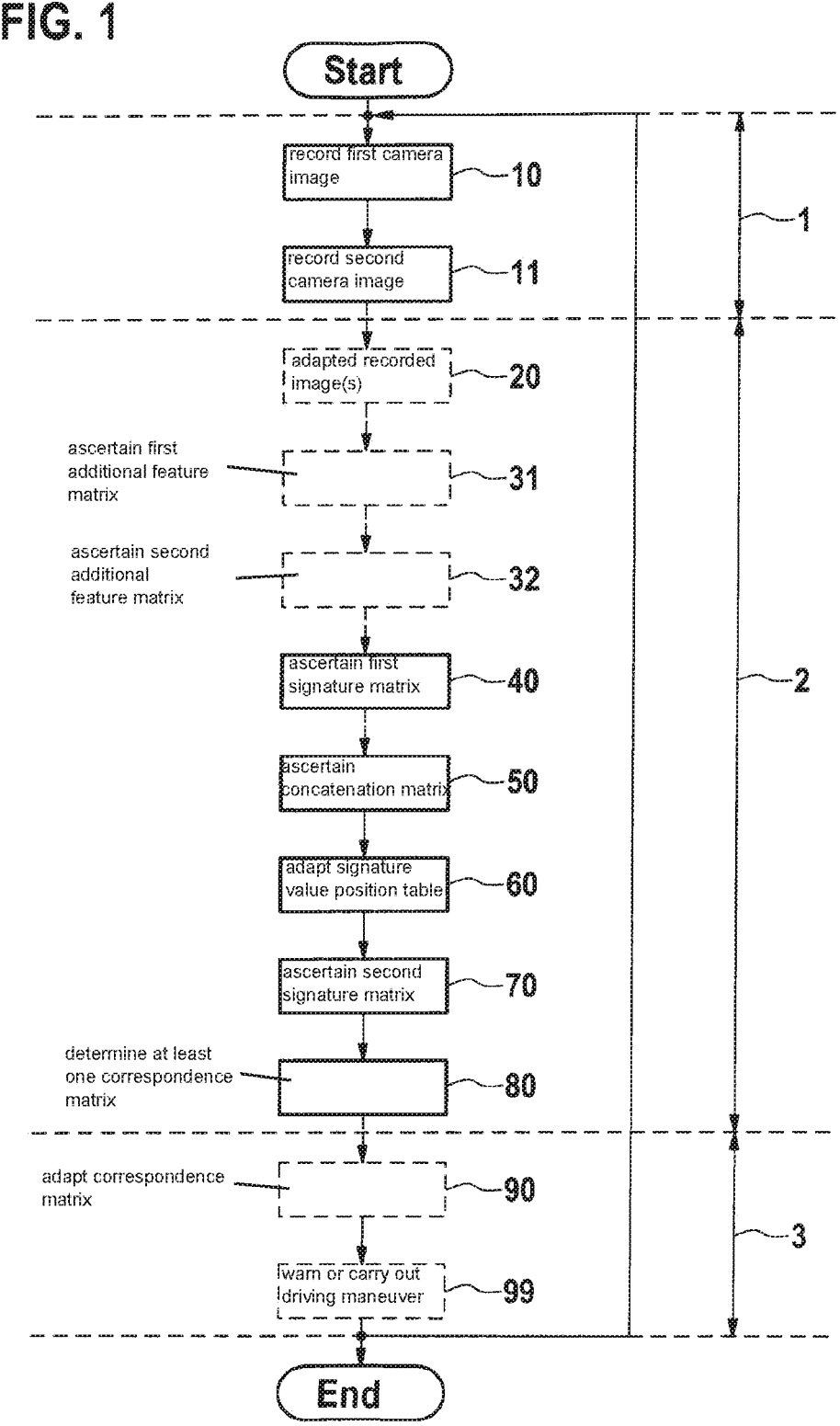
FIG. 1 shows a flowchart of an example method as a block diagram, in accordance with the present invention.

A flowchart of the method is depicted as a block diagram in FIG. 1. The method starts with a recording 10 of a first camera image, the first camera image being updated at a predefined recording rate. A second camera image is subsequently recorded in step 11. The first and the second camera image have a predefined resolution. Furthermore, recording 10 of the first camera image and recording 11 of the second camera image each take place at the predefined recording rate, the first camera image and the second camera image being recorded, for example, with the aid of a camera and having a predefined time offset relative to one another. For example, recordings 10 and 11 take place at 60 camera images per second, the first and the second camera image each having at least one XGA resolution, i.e., that each recorded camera image includes at least 1024×768 pixels. The first and the second recorded camera image each advantageously have a FullHD resolution with 1920×1080 pixels and particularly preferably each have a 4K UHD resolution with 3840×2160 pixels. All method steps following recording 10 of the first camera image may be ascertained in one computing cycle or in one predefined clock frequency of the processing unit of an SoC used or of a control unit, which is 1 GHz, for example. In the process, one element each of a matrix is ascertained per clock cycle. The respectively ascertained matrix elements are each stored in a memory, some ascertained matrix elements being only briefly stored for subsequent method steps of the instantaneous clock cycle or being optionally overwritten in the following clock cycle. Initially, it is optionally provided in a step 20 to adapt the recorded first camera image and/or the recorded second camera image, for example, to transform a respective RGB color image into a gray-value image and/or to scale the first and the second camera image. In an also optional step 31, one additional feature is ascertained for each pixel of the first camera image as a function of the first camera image and is assigned to an additional feature element of a first additional feature matrix. The first additional feature matrix represents a further property of the pixels of the first camera image. Step 31 may encompass an ascertainment of color values for a respective pixel and/or noise values for the surroundings of a respective pixel and/or an identification of objects and/or segments in the first camera image at the first coordinates, each of which are assigned to the respective pixel in the first additional feature matrix. In further optional step 32, an additional feature is ascertained for each pixel of the second camera image as a function of the second camera image and assigned to an additional feature element of a second additional feature matrix. The second additional feature matrix represents a further property of the pixels of the second camera image. Step 32 may encompass an ascertainment of color values for a respective pixel and/or noise values for the surroundings of a respective pixel and/or an identification of objects and/or segments in the second camera image at the second coordinates, each of which are assigned to the respective pixel in the second additional feature matrix. In step 40, a first signature matrix or a signature value of a signature matrix element of the first signature matrix is ascertained at instantaneous first coordinates. In step 50, a concatenation matrix is ascertained as a function of the first signature matrix or the coordinates stored in a signature value position table are assigned to the signature value ascertained in step 40 in a concatenation matrix element of the concatenation matrix having the instantaneous first coordinates. In step 60, a signature value position table is adapted as a function of the first signature matrix or the instantaneous first coordinates are assigned to the signature value ascertained in step 40. In step 70, a second signature matrix or a signature value of a signature matrix element of the second signature matrix is ascertained at instantaneous second coordinates. The second coordinates advantageously differ from the first coordinates. In other words, the second coordinates advantageously trail the first coordinates with a fixed coordinate offset. In step 80, at least one correspondence matrix is determined as a function of the second signature matrix and of the signature value position table and as a function of the concatenation matrix and of the first and second camera image. The correspondence matrix is optionally also determined as a function of the first additional feature matrix and/or of the second additional feature matrix. The correspondence matrix is determined via a difference formation between the second coordinates and the first coordinates assigned to the signature value of the signature matrix element of the second signature matrix ascertained in the signature value position table in step 70, or the first coordinates, which are stored by the first coordinates in the concatenation matrix assigned to the signature value ascertained in step 70. The selection of the first coordinates for the difference formation for determining the correspondence matrix to be carried out in step 80 takes place as a function of a property of the pixels in the first camera image at the corresponding first coordinates and/or of a property of the pixel in the second camera image at the second coordinate. In one optional step 90, it may be provided to adapt the ascertained correspondence matrix by checking the plausibility of the ascertained correspondence matrix elements. In one optional continuing step 99, it may be provided that a driver of the vehicle, warned as a function of the correspondence matrix and/or a semi-autonomous or autonomous driving assistance method, carries out a driving maneuver as a function of the ascertained correspondence matrix. The method is continually repeated or carried out continuously at the predefined clock frequency or in the computing cycle, the instantaneous first coordinates and the instantaneous second coordinates being adapted in a predefined sequence in each clock cycle. If a recording 10 and 11 of the respective first camera image or second camera image takes place sequentially row by row from upper left to bottom right in a predefined sequence, then ascertainment 40 of the first signature matrix and ascertainment 70 of the signature value of the signature matrix element of the second signature matrix and ascertainment 70 of the correspondence matrix advantageously also have this predefined sequence. In other words, the first signature matrix, the concatenation matrix, the second signature matrix, as well as the correspondence matrix are advantageously ascertained in this case sequentially and in the predefined sequence row by row from upper left to bottom right. The respectively ascertained signature value of the first signature matrix and of the second signature matrix are stored, in particular, only briefly for subsequent method steps of the instantaneous clock cycle and overwritten in the following clock cycle, so that the memory requirement for the method is reduced.

In one embodiment of the method, multiple first camera images may be recorded, each of which has a different time offset relative to the second camera image. The method is subsequently carried out cyclically in parallel for each of the recorded first camera images and accordingly, at least one offset-dependent correspondence matrix is ascertained for each recorded first camera image. In one alternative embodiment of the method, multiple second camera images may be recorded, each of which has a different time offset relative to the first camera image. The method is subsequently carried out cyclically in parallel for each of the recorded second camera images and, accordingly, at least one offset-dependent correspondence matrix is ascertained for each recorded second camera image. In one optional step 95, a consolidated correspondence matrix is subsequently ascertained. The consolidated correspondence matrix is ascertained via a selection of the physically correct elements of the respective offset-dependent correspondence matrix for different first or second camera images as a function of a comparison of the ascertained correspondence matrices among one another and/or in connection with earlier determined correspondence matrices. The offset-dependent correspondence matrices represent different velocity hypotheses between pixels of the second camera image and the correlating pixels from the first camera images. The consolidated correspondence matrix results after a check of the various velocity hypotheses assigned to the second coordinates or after a check of the offset-dependent correspondence matrices for plausibility. This increases the proportion of reliably ascertained correspondence matrix elements in the consolidated correspondence matrix.

Time domains 1, 2, and 3 are also depicted in FIG. 1. In first time domain 1, recordings 10 and 11 of the camera images are updated at the predefined recording rate, which is predefined, for example, by a camera property for recording 10 and 11 of first and second camera image 101 and 102.

In second time domain 2, the computational operations take place in the various method steps for determining the correspondence matrix at a predefined clock frequency or with one computing cycle of an SoC or of a control unit. Recording 11 of second camera image 102 may alternatively be assigned to second time domain 2, i.e., ascertainment 70 of the signature value for the second signature matrix element and the subsequent method steps may be already carried out with only one recorded pixel of second camera image 102. In second time domain 2 or in third time domain 3, adaptation 90 of the correspondence matrix, ascertainment 95 of a consolidated correspondence matrix, and step 99 take place, step 90, 95, and 99 each capable of being carried out at a specific repetition rate differing from one another.

A memory requirement for the method depicted in FIG. 1, and thus, the silicon surface required for one SoC, is influenced significantly by a predefined length of the signature value. At a predefined length of the signature value of 8 bits, new first coordinates are more frequently assigned to the respective signature values in the signature value position table over time than at a predefined length of 32 bits, since a predefined length of the signature value of 32 bits characterizes more exactly the respective surroundings of the pixel ascertained in the instantaneous clock cycle and, in general, occurs correspondingly less frequently. A size of a signature value position table is longer, however, for the predefined length of the signature value of 32 bits than at 8 bits and the signature value position table with $2^{32}$ positions is correspondingly much greater compared to $2^8$ positions.

Figure 2:
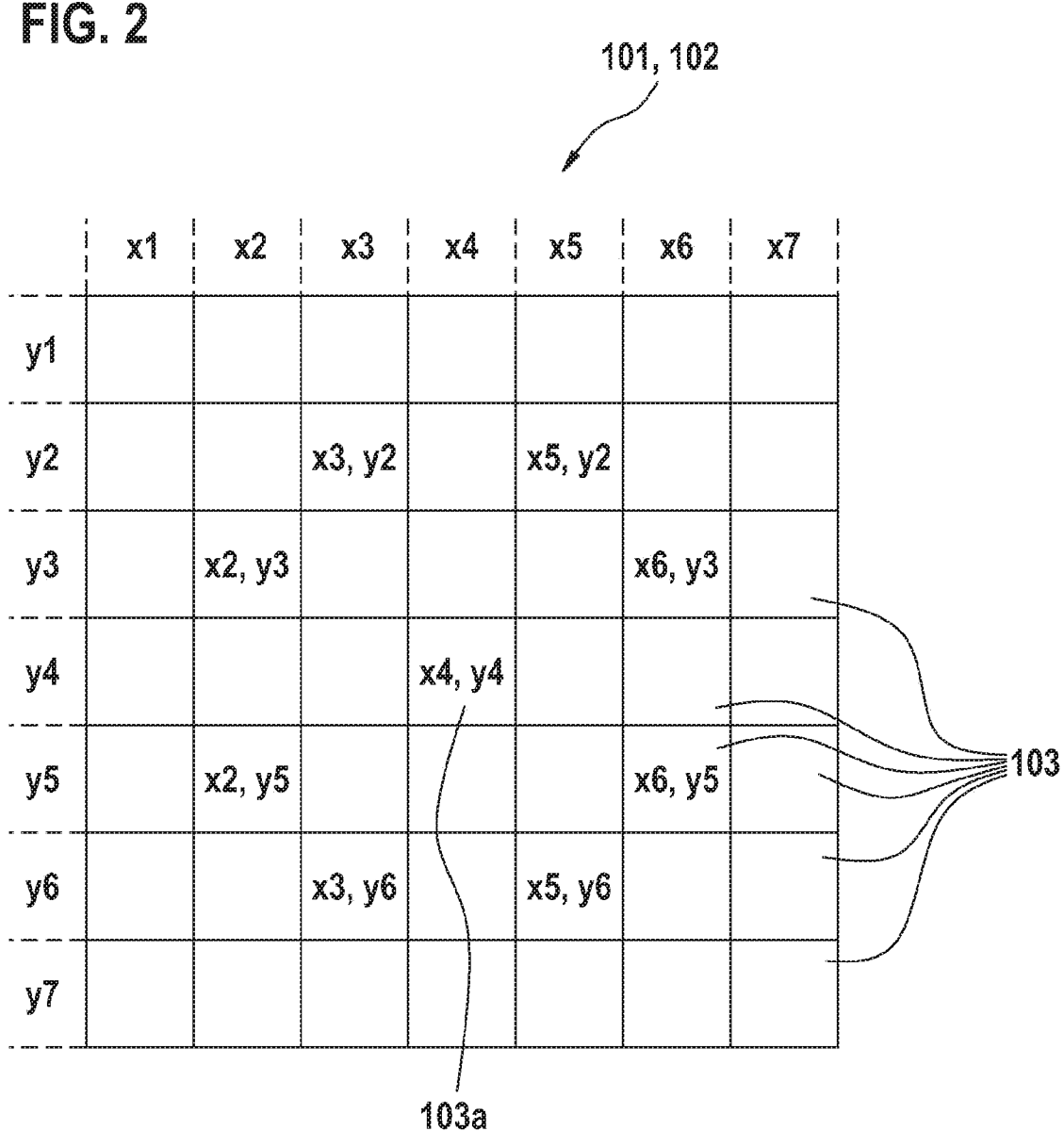
FIG. 2 shows a camera image.

A recorded camera image 101 or 102 including a plurality of pixels 103 is depicted in FIG. 2, for example, a first camera image 101 or a second camera image 102, the resolution for increasing the clarity depicted in FIG. 1 being selected with merely 7×7 pixels. First camera image 101 and second camera image 102 advantageously have a significantly higher resolution of at least 64×64 pixels, particularly preferably at least a resolution of 1024×768 pixels (XGA) with a total of 786,432 individual pixels. Each pixel 103 of a camera image 101, 102 is assigned, for example, in FIG. 1, specific first coordinates or second coordinates or a coordinate pair as a function of a row number y1, y2, y3, y4 y5, y6 or y7, etc., and a column number x1, x2, x3, x4, x5, x6 or x7 etc., of camera image 101, 102, for example, first or second coordinates (x4; y4) to pixel 103a. First camera image 101 and second camera image 102 are recorded, for example, as RGB color images, i.e., each pixel of respective camera image 101, 102 having corresponding first or second coordinates are assigned a red component, a green component and a blue component. A first and/or second camera image 101, 102 recorded as a color image may be transformed into or adapted to a gray-value image after its recording 10 and 11, as a result of which each pixel 103 is assigned a gray value. The gray value, stored advantageously with 12 bits, may, for example, be determined as a function of an RGB color value. Accordingly, one gray value per pixel is between 0 and 4095. The recording rate for first camera image 101 and second camera image 102 is in each case, for example, 60 camera images per second or 60 Hz. For example, first camera image 101 and second camera image 102 are two camera images of a camera recorded in succession or temporally offset, which records camera images at 60 Hz in such a way that first camera image 101 and second camera image 102 generally differ only marginally from one another. The differences between first camera image 101 and second camera image 102 result, for example, from the fact that the camera is situated at a vehicle, the vehicle moving in one driving direction. First camera image 101 and second camera image 102 of the camera recorded temporally offset differ accordingly, for example, as a function of an ego movement of the vehicle, of distances between the vehicle and objects as well as of a movement of objects in the surroundings of the vehicle.

Figure 3:
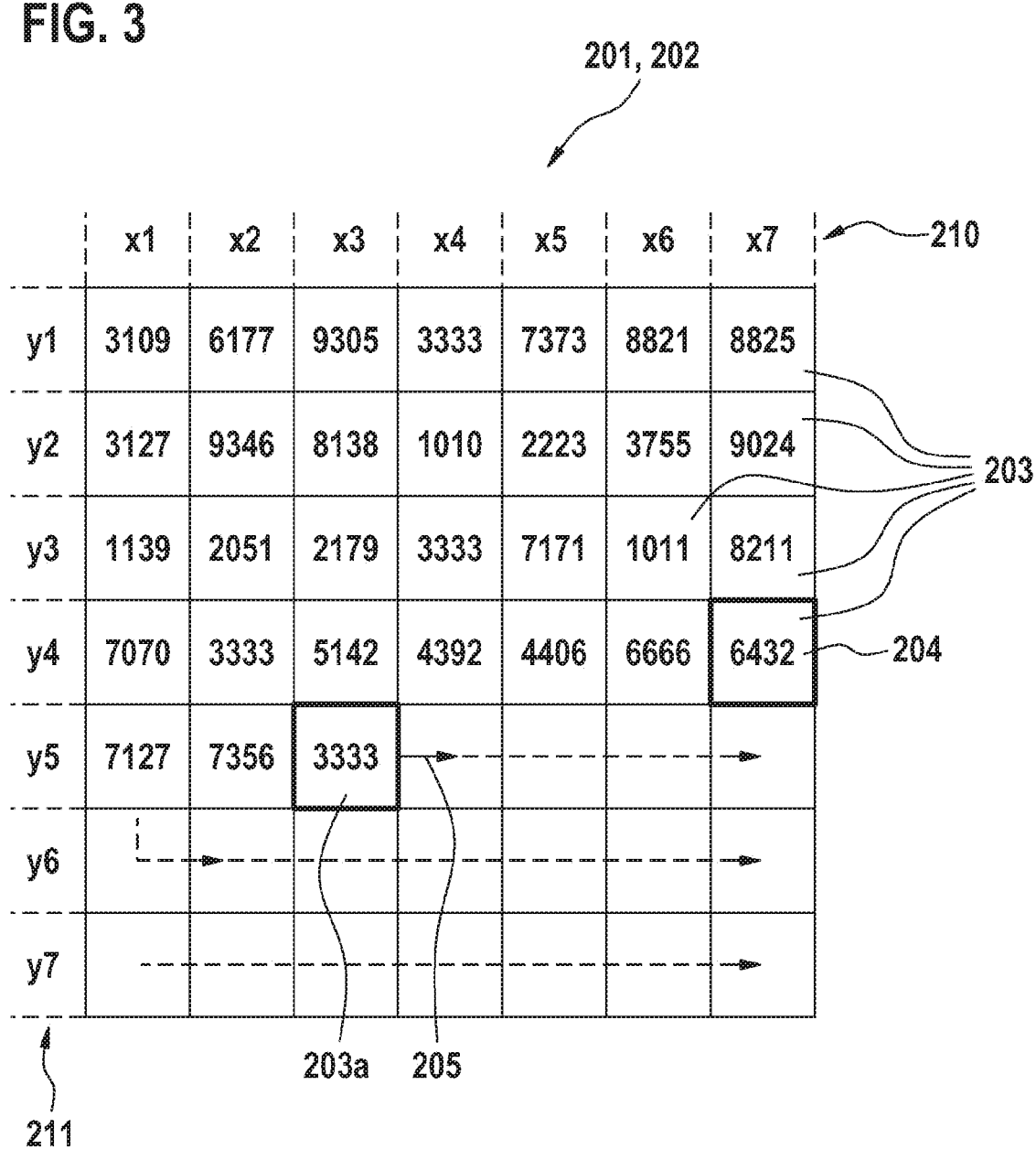
FIG. 3 shows a signature matrix in accordance with an example embodiment of the present invention.

A first signature matrix 201 for first camera image 101 and a second signature matrix 202 for second camera image 102 are depicted by way of example in FIG. 3. Signature matrix 201 is ascertained as a function of first camera image 101 or of the first gray-value image for first camera image 101, one signature value 204 being determined for each signature matrix element 203. Signature value 204 represents the surroundings of a pixel 103 of respective camera image 101 or 102 assigned to signature matrix 203 and may be stored, for example, as an 8 bit, 16 bit or 32 bit value. Accordingly, the 16 bit signature value has a value of between 0 and 65535. Signature value 204 for each signature matrix element 203 may be determined via a summation and/or a difference formation, for example, from the gray values, in each case surrounding the assigned pixel in a 3×3 matrix. Alternatively, more complicated calculations of the signature value for a respective pixel are possible. It may be provided to determine no signatures directly at an image edge of a camera image, because in this example a 3×3 matrix is required for determining a signature value, for which reason, for example, signature values for first and/or second signature matrix elements having first or second coordinates at the image edge of the first and/or second signature matrix within a width of, for example, one pixel, are characterized as invalid (not depicted). Each signature matrix element 203 having a signature value 204 of signature matrix 201, 202 are assigned specific first or second coordinates or a coordinate pairing as a function of a row number 211 y1, y2, y3, y4, y5, y6, or y7 and a column number 210 x1, x2, x3, x4, x5, x6 or x7 of signature matrix 201, 202, each of which represents a corresponding pixel in camera image 101, 102 at these or at assigned first or second coordinates. Signature matrix 201 and 202 is advantageously determined for signature matrix element 203 in the computing cycle of an SoC or of a control unit, the sequence of the ascertainment of individual signature matrix elements 203 and the clock frequency of the ascertainment being predefined. For example, signature matrix element 203 of signature matrix 201 and 202 is ascertained row by row from top to bottom and from left to right, in particular, one element of a matrix each per clock cycle. The computing cycle may be in a range of 1 MHz to 10 GHz. This is depicted in FIG. 3 by signature matrix element 203a ascertained in the instantaneous clock cycle having signature value 3333 and first or second coordinates x3; y5. In the last clock cycle, signature matrix element 203 has been ascertained having signature value 7365 and first or second coordinates x2; y5, and in the next cycle signature matrix element 203 is ascertained having first or second coordinates x4; y5. The sequence of the calculation of signature matrix element 203 in the computing cycle is illustrated by direction arrow 205 in FIG. 3. Alternative calculation sequences of signature matrix elements 203 in signature matrix 201 or 202 are possible, for example, cyclically column by column from right to left and from top to bottom. First signature matrix 201 and second signature matrix 202 in the instantaneous clock cycle have first and second coordinates preferably differing from one another. In other words, the instantaneous work coordinates of a clock cycle, i.e., the first coordinates and the second coordinates are adapted in each clock cycle, in particular, in a predefined sequence, the second coordinates used in step 70 for ascertaining second signature matrix 70 advantageously following behind the instantaneous first coordinates used in step 40 with a fixed or variable coordinate offset. In one variable coordinate offset, the coordinate offset is adapted, for example, as a function of the first and/or second coordinates. For example, the coordinate offset between the first coordinates and the second coordinates may be +30 pixels in the vertical direction or, in other words, the first coordinates precede the second coordinates by 30 clock cycles if the ascertainment of the second signature matrix starts as a function of the second camera image. During the course of processing, the coordinate offset may slowly increase to +70 pixels in the vertical direction or may be reduced to +10 pixels or even to −10 pixels in the vertical direction, a variable coordinate offset resulting due to the fact that the first signature matrix and the signature value of the signature matrix element of the second signature matrix is not ascertained at every point in time in the same clock cycle, but that one of the two ascertainments 40, 70 pauses temporarily, whereas the respectively other ascertainment 40, 70 continues. It is particularly advantageous if these pauses in the case of a row by row processing do not last longer than one row. The coordinate offset may be negative or positive or zero and may also change its sign during the course of the processing of one image pair. A variable coordinate offset is particularly advantageous for shifting a search area.

Figure 4:
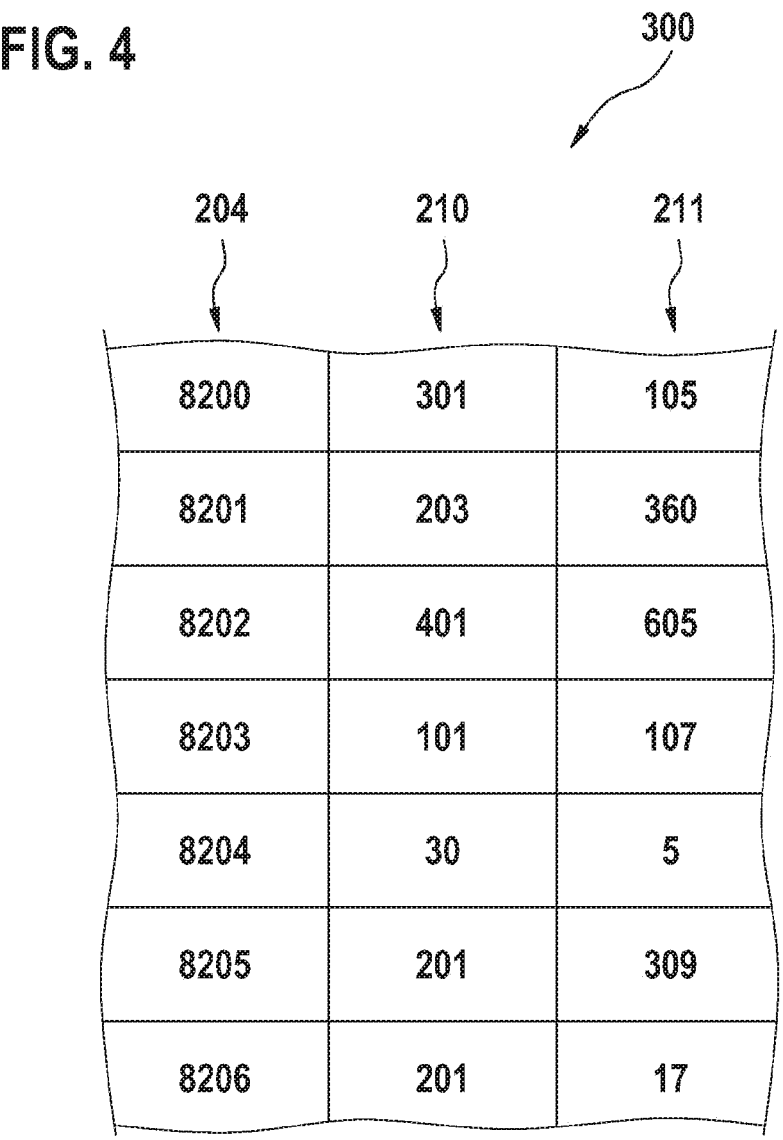
FIG. 4 shows a detail from a signature value position table in accordance with an example embodiment of the present invention.

A detail of a signature value position table 300 is depicted in FIG. 4. All fundamentally possible signature values 204 corresponding to the predefined word length, for example, 16 bits, are present as addresses in signature value position table 300. The adaptation or ascertainment of signature value position table 300 takes place cyclically, in the instantaneous clock cycle, signature value 204 of first signature matrix 201 in signature value position table 300 ascertained in step 40 being assigned the first coordinate or the instantaneous work coordinate pairing 210, 211 of signature matrix element 203 for ascertained signature value 204, or the coordinates of corresponding pixel 103. Accordingly, each possible signature value 204 in signature value position table 300 is assigned the first coordinates at which this signature value 204 has been ascertained in the instantaneous cycle or for the last time. During the course of processing, overwritings of the first coordinates assigned to a signature value 204 may result in signature value position table 300, as a result of which an unambiguity in the assignment of corresponding pixels between first and second camera image 101, 102 with the aid of the signature value is lost. In this case, multiple first coordinates having the same signature value have been ascertained in first signature matrix 201. For example, one signature value 204 of first signature matrix 201 ascertained in the instantaneous clock cycle for signature matrix element 203a, in this example, signature value 3333, in signature value position table 300, is assigned the corresponding coordinates of signature matrix element 203a, in this example, coordinates x3; y5, and column coordinate 210 x3 and row coordinate 211 y5. This signature value 3333 was, however, assigned coordinates x2; y4 in signature value position table 300 eight clock cycles previously, since there ascertained signature value 3333 occurred for the last time. In order not to lose these last coordinates x2; y4 as information by overwriting the instantaneous coordinates of signature matrix element 203a, concatenation matrix 400 is ascertained.

Figure 5:
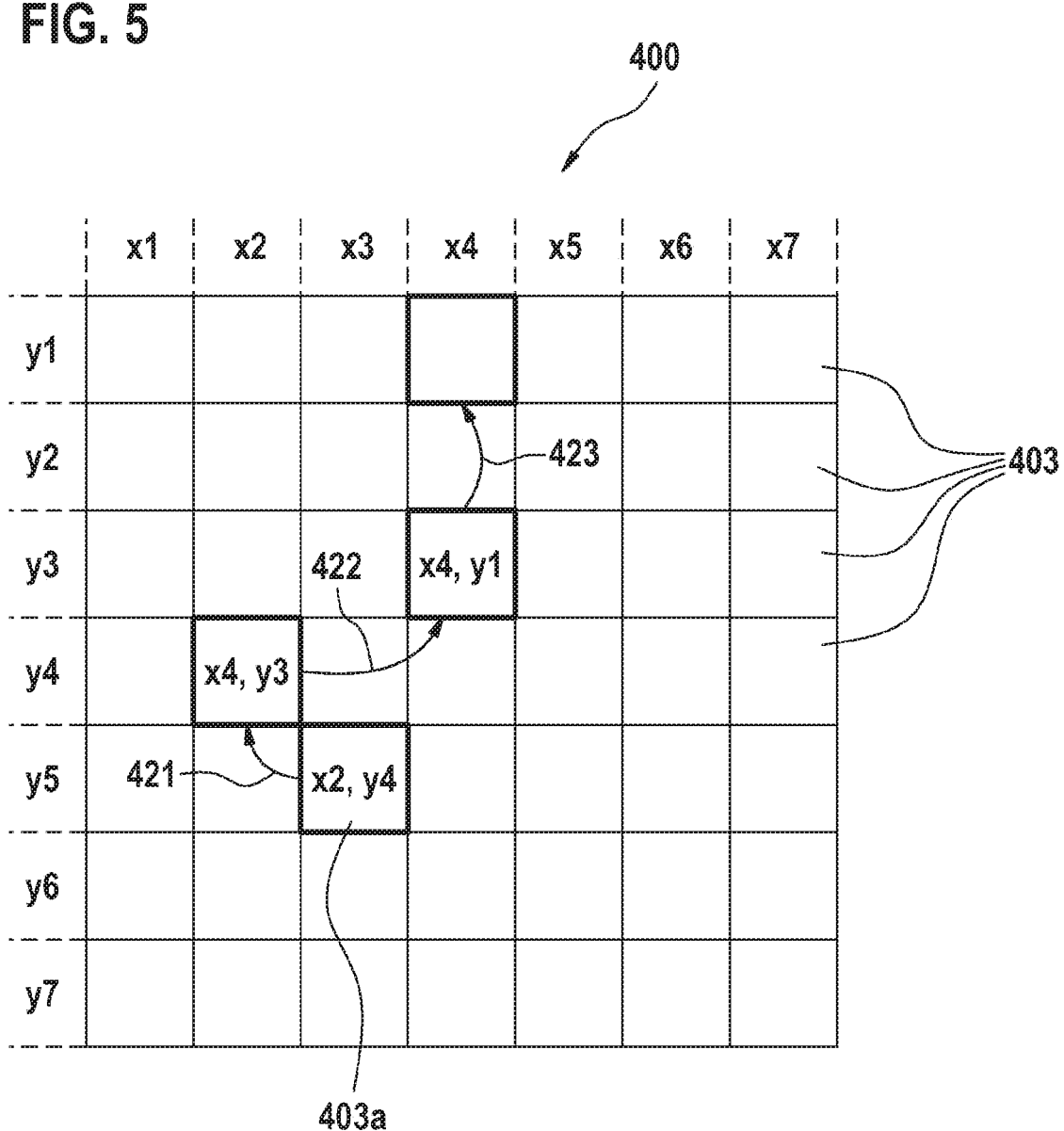
FIG. 5 shows a concatenation matrix in accordance with an example embodiment of the present invention.

A concatenation matrix 400 for first signature matrix 201 from FIG. 3 is depicted in FIG. 5. In ascertainment 50 of concatenation matrix 400, the most recent first coordinates x2; y4 for signature value 204 stored in signature value position table 300 are written into corresponding concatenation matrix element 403a having the instantaneous first coordinates of signature matrix element 203a before first coordinates x3; y5 of signature matrix 203a of first signature matrix 201 in signature value position table 300 present in step 60 in the instantaneous clock cycle are assigned to corresponding signature value 204. Accordingly, the most recent first coordinates x2; y4 overwritten by the entry of instantaneous first coordinates x3; y5 in signature value position table 300 are stored in concatenation matrix 400 and are thus retained. Corresponding entries for preceding clock cycles are depicted in FIG. 5 for signature value 3333 in further concatenation matrix elements 403 of concatenation matrix 400. The respective coordinate references for identical signature values ascertained in previous clock cycles or previously, which are stored in the concatenation matrix, are also indicated by arrows 421, 422 and 423 in FIG. 5. Concatenation matrix 400 also ascertained in the computing cycle represents an effective option for avoiding loss of information in the method according to the present invention. Ascertainment 80 of the correspondence matrix as a function of concatenation matrix 400 therefore significantly reduces erroneous assignments of pixels as a result of overwritings in signature value position table 300.

Figure 6:
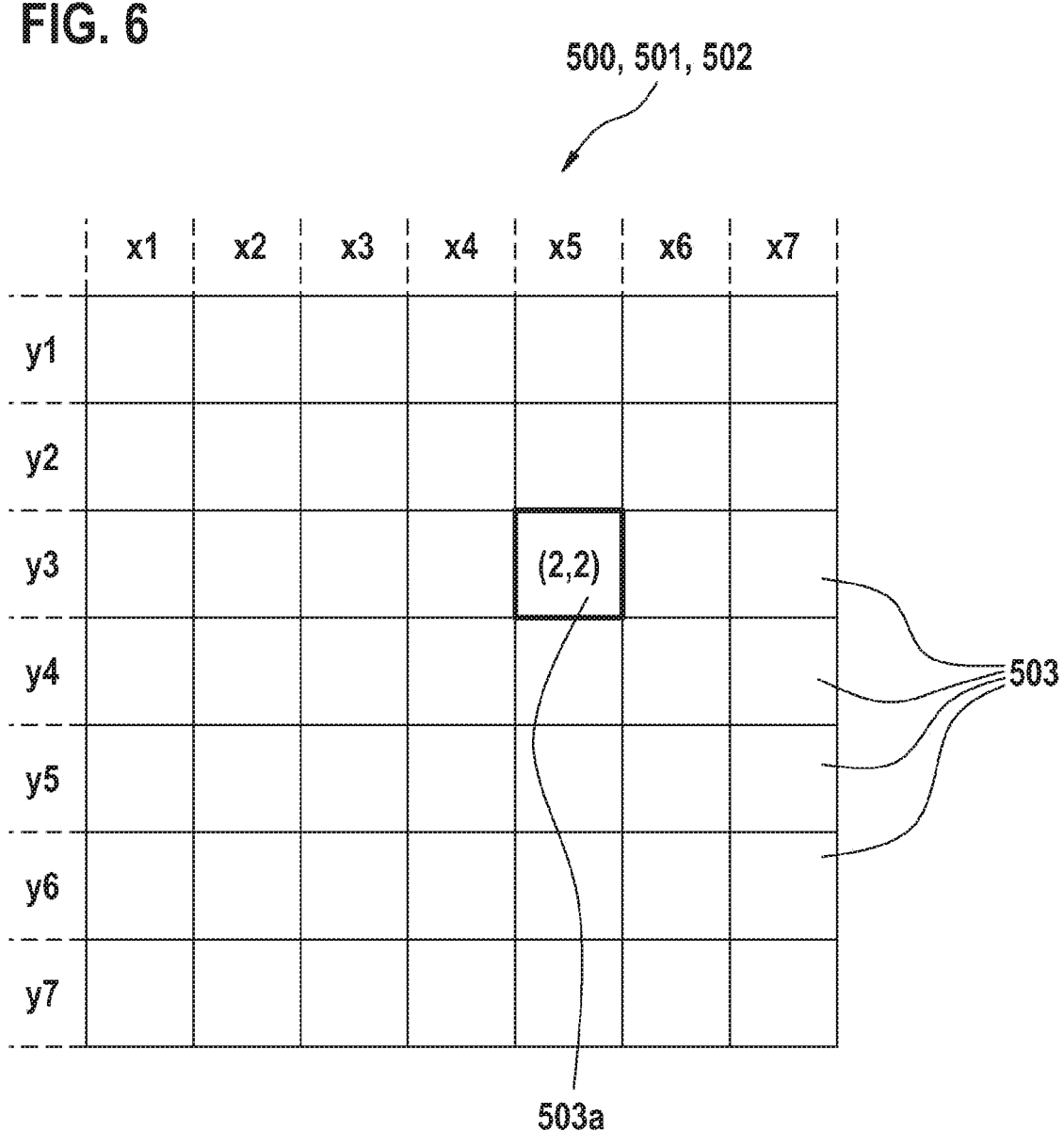
FIG. 6 shows a correspondence matrix in accordance with an example embodiment of the present invention.

A correspondence matrix 500, 501, 502 is shown in FIG. 6. Correspondence matrix 500 exhibits a coordinate difference in correspondence matrix elements 503, for example, in correspondence matrix element 503a 2;2, and the optical flow vector between the second coordinates of second signature matrix 202, or of the second coordinates of correspondence matrix 500 and the first coordinates from signature value position table 300 assigned to the respective signature value. For example, signature value 9305, which is assigned to first coordinates x3; y1 by signature value position table 300, is determined (not shown) at second coordinates x5; y3 of second signature matrix 202, since first signature matrix 201 has this signature value 9305 at first coordinates x3; y1. Optical flow vector 2; 2 results for correspondence matrix elements 503a having second coordinates x5; y3 characterized in FIG. 6 as a result of a coordinate difference between second coordinates x5; y3 and first coordinates x3; y1. Accordingly, a determination of mutually corresponding pixels between the first camera image and the second camera image and the determination of the optical flow vectors between these corresponding pixels takes place via the ascertainment of correspondence matrix 500. It may be provided to ascertain directional correspondence matrices 501 and 502 so that each correspondence matrix element 503 of respective correspondence matrix 501 and 502 is assigned only one one-dimensional value. The correspondence matrix is initially determined by reading out first coordinates in signature value position table 300 assigned to an ascertained signature value of an instantaneous signature matrix element of second signature matrix 202. At least one concatenation matrix element 403 is subsequently read out as a function of these assigned first coordinates. A sequence of concatenation matrix elements is preferably read out as a function of the assigned first coordinates and of the first coordinates stored there in each case, for example, three concatenation matrix elements or coordinates are read out, as indicated by arrows 421 and 422 in FIG. 5, in each case the same signature value having been ascertained for these read-out first coordinates. An additional property of a pixel of the second camera image, for example, a color value, having the second coordinates of the second signature matrix of the instantaneous cycle, is subsequently ascertained or read out. This read-out additional property is subsequently compared with the respective property of the pixels of the first camera image at the read-out first coordinates. A correspondence matrix element of the correspondence matrix is then determined as a function of the comparison, i.e., by a difference formation between the second coordinates of the instantaneously ascertained signature element of the second signature matrix and the first coordinates from the signature value position table assigned to this signature value or the first coordinates read out from at least one concatenation matrix element as a function of the ascertained additional properties of the respective pixels.

Figure 7:
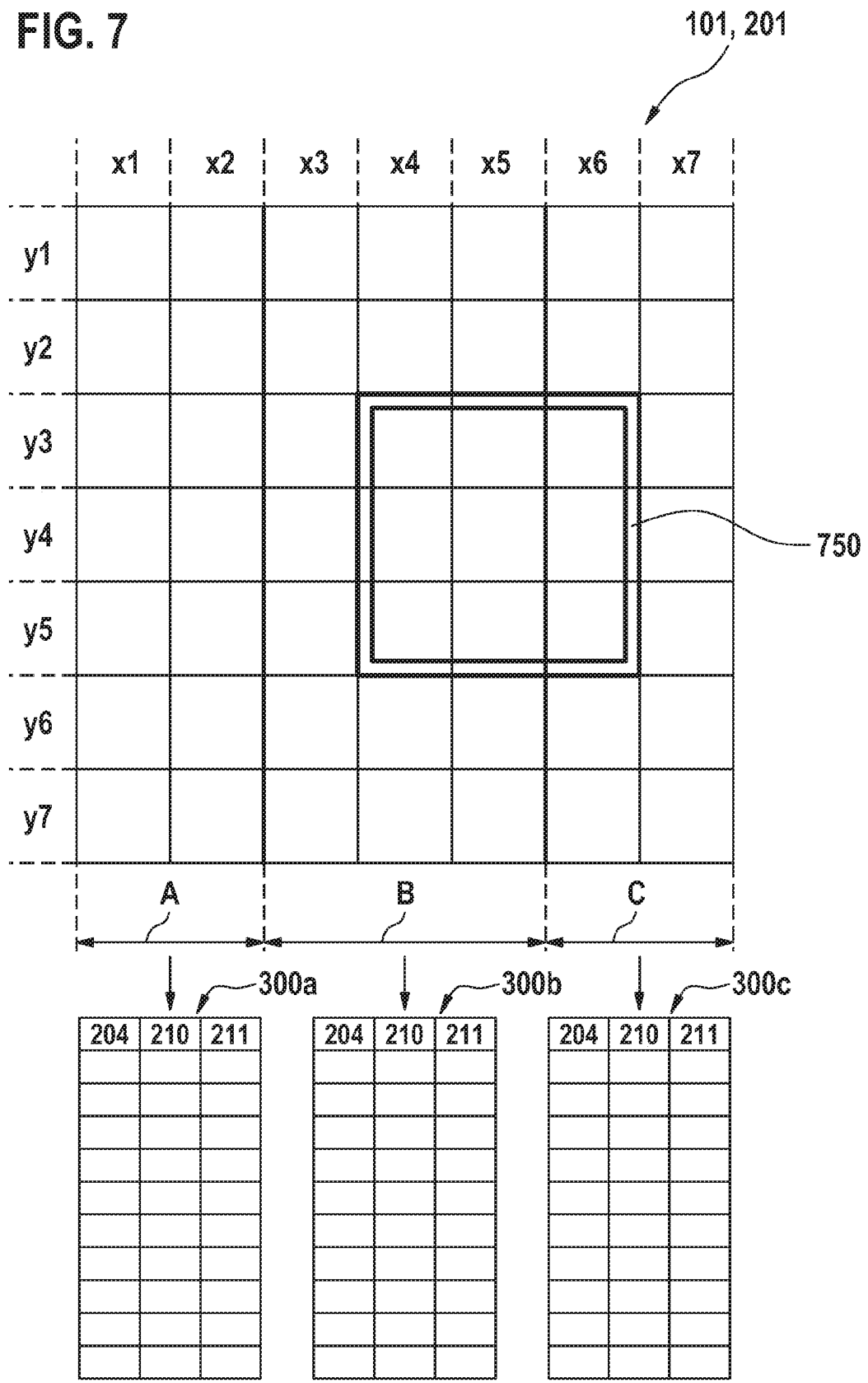
FIG. 7 shows a division of the first signature matrix into subdivisions and a search area, in accordance with an example embodiment of the present invention.

A division of the first signature matrix into three subdivisions A, B and C is depicted in FIG. 7. One separate signature value position table 300a, 300c and 300c each and/or one separate concatenation matrix 400a, 400c and 400c each is/are ascertained for each of the subdivisions A, B and C. In step 80, the appropriate signature value position tables 300a, 300c or 300c and/or the appropriate concatenation matrix 400a, 400c and 400c are initially selected for ascertaining correspondence matrix 500 as a function of the instantaneous second coordinates processed in step 70. Therefore, to ascertain the correspondence matrix in signature value position table 300a, 300c or 300c selected or assigned to the instantaneous second coordinates, the first coordinates assigned to the signature value and/or the correspondingly assigned concatenation matrix elements are read out from the appropriate concatenation matrix 400a, 400c or 400c having the additional first coordinates for this signature value. In one optional refinement, it is possible to adapt a form and/or a size of a subdivision A, B and C for ascertaining signature value position tables 300a, 300c and 300c and/or the concatenation matrices 400a, 400c and 400c as a function of a detected velocity of a vehicle, which includes an SoC or a control unit for carrying out the method, and/or as a function of the first additional feature matrix. A search area 750 is also depicted in FIG. 7 as a sub-matrix in first signature matrix 201 having 3×3 pixels. Search area 750 may be ascertained as a function of the instantaneous second coordinates and/or as a function of correspondence matrices ascertained at an earlier point in time. Search area 750 includes one or multiple subdivisions A, B and C. For example, search area 750 is situated symmetrically around instantaneous second coordinates x5; y4, as depicted by the double-line frame in FIG. 7. An asymmetrical position of search area 750 around instantaneous second coordinates x5; y4 is alternatively also possible. Search area 750 may optionally also be ascertained as a function of an optical flow vector and of the instantaneous second coordinate or of a correspondence matrix from the past. Search area 750 delimits the first coordinates read out from signature value position tables 300a, 300c and 300c and/or from concatenation matrices 400a, 400c and 400c for an ascertained signature value for ascertaining the correspondence matrix or the difference formation to the coordinates in this search area 750. In one optional refinement, it is possible to adapt a form and/or a size of a search area 750 as a function of a detected velocity of a vehicle and/or as a function of correspondence matrices from the past and/or as a function of the first and/or second additional feature matrix and/or as a function of objects and/or segments identified in first and/or second camera image 101, 102.

It may happen that no reliable correspondence is ascertained for a pixel in second camera image 102. For example, both the first coordinates read out in step 80 as a function of the signature value in the signature value position table ascertained in step 70, as well as the first coordinates assigned to this signature value by the concatenation matrix and the properties of the pixels of the first and second camera image assigned in each case to the first coordinates and/or the corresponding elements of the first additional feature matrix and/or of the second additional feature matrix allow for no reliable assignment between a pixel of a first camera image and a pixel of a second camera image. In cases of a missing reliable assignment, the correspondence matrix may be set at the corresponding second coordinates to a dummy value, for example, to zero. Even in the case of missing assignments, the method therefore guarantees an ascertainment of a correspondence matrix after a predefined number of clock cycles as a function of the clock frequency, as a result of which a real-time capable hardware implementation is enabled.

Figure 8:
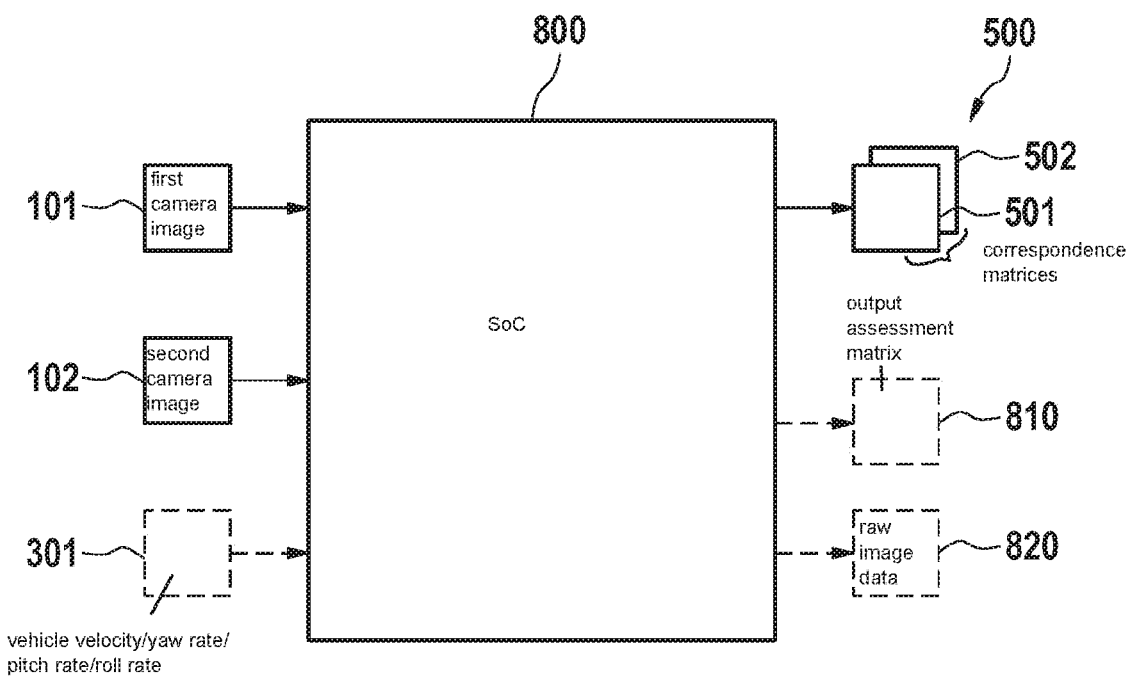
FIG. 8 shows a system-on-a-chip (SoC) in accordance with an example embodiment of the present invention.

An example SoC 800 for carrying out the method according to the present invention is depicted in FIG. 8. SoC 800 detects a first camera image 101 and a second camera image 102, first camera image 101 and second camera image 102 preferably being recorded with the aid of a camera. In addition, the SoC may optionally also detect a vehicle velocity 301 and/or a yaw rate of a vehicle and/or a pitch rate and/or a roll rate of a vehicle for adapting subdivisions A, B and C. SoC 800 is configured to generate an output signal that represents correspondence matrix 500 or correspondence matrices 501 and 502. SoC 800 may optionally be configured to generate a further output signal that represents an assessment matrix 810 for correspondence matrix 500 or for correspondence matrices 501 and 502. By outputting assessment matrix 810, it is possible, for example, to carry out adaptation 90 of correspondence matrix 500 later in a control unit. SoC 800 may optionally also be configured to output raw image data 820 that represent first camera image 101 and second camera image 102. These raw image data 820 may, for example, be displayed to a driver of a vehicle. The SoC has a clock frequency between 1 MHz AND 10 GHz and an electrical memory between 1 MB to 5 GB.

What is claimed is:

1. A method for continuously determining mutually corresponding pixels between a first camera image and a second camera image, comprising the following steps:
   recording the first camera image;
   recording the second camera image;
   ascertaining, per clock cycle of a predefined clock frequency, at least one first signature matrix element having first coordinates of a first signature matrix as a function of the first camera image, the ascertained signature value of the first signature matrix element representing in each case surroundings of a pixel of the first camera image;
   assigning the first coordinates of each of the clock cycles to the ascertained signature value of the first signature matrix element in a signature value position table;
   ascertaining, per clock cycle of the predefined clock frequency, at least one signature value of a second signature matrix element having second coordinates of a second signature matrix as a function of the second camera image, the ascertained signature value of the second signature matrix element representing surroundings of a pixel of the second camera image;
   determining at least one element of a correspondence matrix as a function of the signature value position table of the signature value of the cyclically ascertained second signature matrix element and of the second coordinates of the second signature matrix element; and
   ascertaining, per clock cycle of the predefined clock frequency, at least one concatenation matrix element of a concatenation matrix as a function of the first signature matrix and of the signature value position table;

wherein the determining of the at least one element of the correspondence matrix is also as a function of the ascertained concatenation matrix, as a function of the first camera image, and as a function of the second camera image.

2. The method as recited in claim 1, wherein the ascertained signature values of the first signature matrix and of the second signature matrix have a predefined length shorter than or equal to 16 bits.

3. The method as recited in claim 1, further comprising the following step:

recording multiple first camera images each having a different time offset relative to the second camera image, the method subsequently being carried out cyclically in parallel for each of the recorded first camera images so that in step of determining the at least one element of the correspondence matrix, multiple elements of respectively offset-dependent correspondence matrices per clock cycle are determined.

4. The method as recited in claim 3, further comprising the following step:

ascertaining a consolidated correspondence matrix as a function of a comparison of the ascertained offset-dependent correspondence matrices among one another or in connection with earlier determined correspondence matrices.

5. The method as recited in claim 1, further comprising the following step:

recording multiple second camera images each having a different time offset relative to the first camera image, the method being subsequently carried out cyclically in parallel for each of the recorded second camera images so that in the step determining the at least one element of the correspondence matrix, multiple elements of respectively offset-dependent correspondence matrices per clock cycle are determined.

6. The method as recited in claim 1, further comprising the following steps:

(i) ascertaining, per clock cycle, an additional feature element of a first additional feature matrix as a function of the first camera image, the additional feature element representing a property of an assigned pixel and/or a property of surroundings of the assigned pixel of the first camera image, and/or (ii) ascertaining, per clock cycle, an additional feature element of a second additional feature matrix as a function of the second camera image, the additional feature element representing a property of an assigned pixel and/or a property of the surroundings of the assigned pixel of the second camera image; and determining the correspondence matrix also as a function of the first additional feature matrix and/or also as a function of the second additional feature matrix.

7. The method as recited in claim 1, wherein multiple signature value position tables and/or multiple concatenation matrices are determined for the first signature matrix, each of the multiple signature value position tables and/or concatenation matrices representing respectively a subdivision of the first signature matrix.

8. The method as recited in claim 1, wherein the determination of the correspondence matrix takes place as a function of a predefined search area, the predefined search area being ascertained as a function of the second coordinates of the clock cycle.

9. The method as recited in claim 1, wherein the second coordinates and the first coordinates cyclically include a coordinate offset, the second coordinates trailing the first coordinates continuously with a fixed or variable coordinate offset at the predefined clock frequency.

10. The method as recited in claim 1, further comprising the following step:

adapting a first correspondence matrix element of the correspondence matrix as a function of the correspondence matrix elements in surroundings of the first correspondence matrix element.

11. An SoC (system-on-a-chip) configured to:

record a first camera image;

record a second camera image;

determine at least one correspondence matrix as a function of the recorded first camera image and of the recorded second camera image; and generate an output signal as a function of the determined correspondence matrix, the output signal representing, in particular, an optical flow vector between the first and the second camera image, wherein the SoC is configured to:

ascertain, per clock cycle of a predefined clock frequency, at least one first signature matrix element having first coordinates of a first signature matrix as a function of the first camera image, the ascertained signature value of the first signature matrix element representing in each case surroundings of a pixel of the first camera image;

assign the first coordinates of each of the clock cycles to the ascertained signature value of the first signature matrix element in a signature value position table;

ascertain, per clock cycle of the predefined clock frequency, at least one signature value of a second signature matrix element having second coordinates of a second signature matrix as a function of the second camera image, the ascertained signature value of the second signature matrix element representing surroundings of a pixel of the second camera image;

determine at least one element of the correspondence matrix as a function of the signature value position table of the signature value of the cyclically ascertained second signature matrix element and of the second coordinates of the second signature matrix element; and ascertain, per clock cycle of the predefined clock frequency, at least one concatenation matrix element of a concatenation matrix as a function of the first signature matrix and of the signature value position table;

wherein the determination of the at least one element of the correspondence matrix is also as a function of the ascertained concatenation matrix, as a function of the first camera image, and as a function of the second camera image.

12. A camera system, comprising:

at least one camera configured to record a first camera image and a second camera image continuously or at a predefined recording rate; and an SoC (system-on-a-chip) configured to:

determine at least one correspondence matrix as a function of the recorded first camera image and of the recorded second camera image; and generate an output signal as a function of the determined correspondence matrix, the output signal representing, in particular, an optical flow vector between the first and the second camera image, wherein the SoC is further configured to:

ascertain, per clock cycle of a predefined clock frequency, at least one first signature matrix element having first coordinates of a first signature matrix as a function of the first camera image, the ascertained signature value of the first signature matrix element representing in each case surroundings of a pixel of the first camera image;

assign the first coordinates of each of the clock cycles to the ascertained signature value of the first signature matrix element in a signature value position table;

ascertain, per clock cycle of the predefined clock frequency, at least one signature value of a second signature matrix element having second coordinates of a second signature matrix as a function of the second camera image, the ascertained signature value of the second signature matrix element representing surroundings of a pixel of the second camera image;

determine at least one element of the correspondence matrix as a function of the signature value position table of the signature value of the cyclically ascertained second signature matrix element and of the second coordinates of the second signature matrix element; and ascertain, per clock cycle of the predefined clock frequency, at least one concatenation matrix element of a concatenation matrix as a function of the first signature matrix and of the signature value position table;

wherein the determination of the at least one element of the correspondence matrix is also as a function of the ascertained concatenation matrix, as a function of the first camera image, and as a function of the second camera image.

13. A control unit configured to continuously determining mutually corresponding pixels between a first camera image and a second camera image, the control unit configured to:
record the first camera image;
record the second camera image;
ascertain, per clock cycle of a predefined clock frequency, at least one first signature matrix element having first coordinates of a first signature matrix as a function of the first camera image, the ascertained signature value of the first signature matrix element representing in each case surroundings of a pixel of the first camera image;

assign the first coordinates of each of the clock cycles to the ascertained signature value of the first signature matrix element in a signature value position table;

ascertain, per clock cycle of the predefined clock frequency, at least one signature value of a second signature matrix element having second coordinates of a second signature matrix as a function of the second camera image, the ascertained signature value of the second signature matrix element representing surroundings of a pixel of the second camera image;

determine at least one element of a correspondence matrix as a function of the signature value position table of the signature value of the cyclically ascertained second signature matrix element and of the second coordinates of the second signature matrix element; and ascertain, per clock cycle of the predefined clock frequency, at least one concatenation matrix element of a concatenation matrix as a function of the first signature matrix and of the signature value position table;

wherein the determination of the at least one element of the correspondence matrix is also as a function of the ascertained concatenation matrix, as a function of the first camera image, and as a function of the second camera image.

14. A vehicle including a camera system, the camera system comprising:
at least one camera configured to record a first camera image and a second camera image continuously or at a predefined recording rate; and
an SoC (system-on-a-chip) configured to:
determine at least one correspondence matrix as a function of the recorded first camera image and of the recorded second camera image; and
generate an output signal as a function of the determined correspondence matrix, the output signal representing, in particular, an optical flow vector between the first and the second camera image, wherein the SoC is further configured to:
ascertain, per clock cycle of a predefined clock frequency, at least one first signature matrix element having first coordinates of a first signature matrix as a function of the first camera image, the ascertained signature value of the first signature matrix element representing in each case surroundings of a pixel of the first camera image;

assign the first coordinates of each of the clock cycles to the ascertained signature value of the first signature matrix element in a signature value position table;

ascertain, per clock cycle of the predefined clock frequency, at least one signature value of a second signature matrix element having second coordinates of a second signature matrix as a function of the second camera image, the ascertained signature value of the second signature matrix element representing surroundings of a pixel of the second camera image;

determine at least one element of the correspondence matrix as a function of the signature value position table of the signature value of the cyclically ascertained second signature matrix element and of the second coordinates of the second signature matrix element; and ascertain, per clock cycle of the predefined clock frequency, at least one concatenation matrix element of a concatenation matrix as a function of the first signature matrix and of the signature value position table;

wherein the determination of the at least one element of the correspondence matrix is also as a function of the ascertained concatenation matrix, as a function of the first camera image, and as a function of the second camera image.

* * * * *